(12) United States Patent
Slik (10) Patent No.: US 9,916,478 B2
(45) Date of Patent: Mar. 13, 2018

(54) DATA PROTECTION ENHANCEMENT USING FREE SPACE

(71) Applicant: NetApp, Inc., Sunnyvale, CA (US)

(72) Inventor: David Anthony Slik, Lasqueti Island (CA)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 15/469,376

(22) Filed: Mar. 24, 2017

(65) Prior Publication Data

US 2017/0277915 A1   Sep. 28, 2017

Related U.S. Application Data

(60) Provisional application No. 62/313,046, filed on Mar. 24, 2016.

(51) Int. Cl.
*G06F 7/04* (2006.01)
*G06F 21/78* (2013.01)
*H04L 29/06* (2006.01)

(52) U.S. Cl.
CPC .............. *G06F 21/78* (2013.01); *H04L 67/42* (2013.01)

(58) Field of Classification Search
CPC ................. G06F 21/10; G06F 21/6218; G11B 20/00086; H04L 63/08
See application file for complete search history.

(56) References Cited

U.S. PATENT DOCUMENTS

| | | | |
|---|---|---|---|
| 2011/0302137 A1* | 12/2011 | Dawkins | ........... G06F 17/30159 707/640 |
| 2013/0339818 A1* | 12/2013 | Baker | ..................... G06F 11/10 714/763 |
| 2016/0062689 A1* | 3/2016 | Cherubini | ............. G06F 3/0619 711/159 |
| 2016/0211869 A1* | 7/2016 | Blaum | ................ H03M 13/373 |
| 2017/0177248 A1* | 6/2017 | Malygin | ............... G06F 3/0619 |

\* cited by examiner

*Primary Examiner* — Ali Abyaneh
(74) *Attorney, Agent, or Firm* — Gilliam IP PLLC (57) ABSTRACT

A data storage system uses the free space that is not yet filled with data after the deployment of the data store. The free space is used to store additional 'opportunistic' protection information for stored data, possibly above and beyond the specified protection level. As the system fills up, the additional protection information is deleted to make room for more data and specified protection information.

17 Claims, 6 Drawing Sheets

Stripe and Fragment 2+1 Example

505 —— Object

Stripe 1  510

Stripe 2

Stripe 3

DATA PROTECTION ENHANCEMENT USING FREE SPACE

BACKGROUND

The present disclosure relates to data storage environments and, more specifically, to improving the reliability of the storage.

The data generated and collected by network users may be stored in data centers connected to the network. A data center typically includes multiple storage devices and a storage management system that enables reading and writing of the data, data deduplication and coding, synching and sharing. The storage devices chosen for a data center generally contain highly reliable storage, though the probability of storage corruption is greater than zero. A variety of techniques are used for protection of the data against losses due to memory faults. For example, a redundant array of independent disks (RAID) may have same data written to two or more storage devices.

With the expansion of cloud computing and mobile devices, the demand for storage facilities grows and new data centers continue to be built. Storage systems typically start out having no data, and are filled over time. Accordingly, there is a significant amount of capacity over time that remains unused ('free space') during a typical storage deployment's early life.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. In other instances, well-known instruction instances, protocols, structures and techniques have not been shown in detail in order not to obfuscate the description.

This disclosure relates to using the free space that is not yet filled with user data after the deployment of a data storage system. The free space is used to store additional 'opportunistic' protection information for stored data, possibly above and beyond a specified protection level. As the data storage system fills up, the additional protection information is deleted to make room for more data and specified protection information instead of additional opportunistic protection information.

Figure 1:
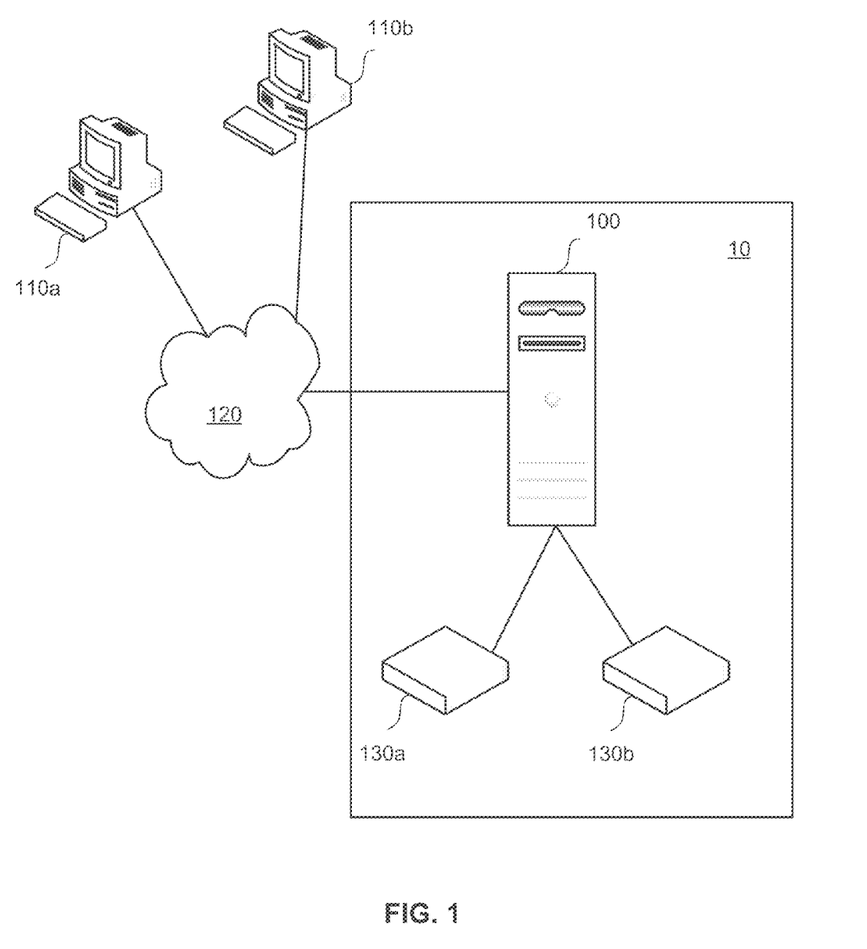
FIG. 1 is a schematic diagram of a data storage system.

With reference to FIG. 1, a system 10 includes a data storage management system 100 in communication with one or more data storage devices 130 (130a, 130b, etc.). The data storage management system 100 manages storing received data in the data storage devices 130, and provides data to client computing devices 110 (110a, 110b, etc.) over a communication network 120.

In some embodiments, the persistent data storage devices 130 can include storage media such as hard disk drives, magnetic tapes, magneto-optical (MO) storage, flash-based storage devices such as solid state drives (SSDs), storage class memory, ReRAM, or any other type of non-volatile storage devices suitable for storing large quantities of data. The storage devices 130 and/or other data storage management systems (not illustrated) of the system 10 can be distributed geographically so that at least some of the data storage devices 130 are connected to the management system 100 over a network (not shown).

Figure 2:
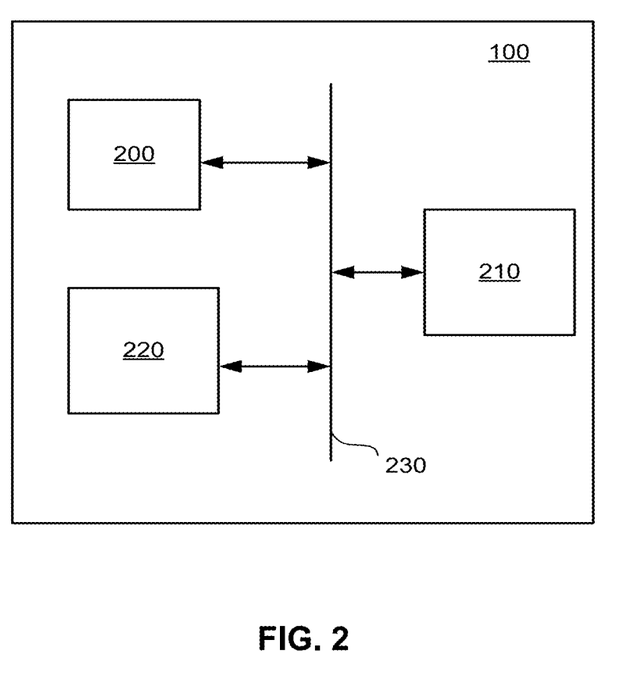
FIG. 2 is a schematic diagram of a data store management system.

With reference to FIG. 2, the data storage management system 100 may include a central processing unit (CPU) or processor 200, memory 210, and a communication interface 220, coupled together by a bus 230 or other link, although other configurations may be used.

The processor 200 executes a program of stored instructions for one or more aspects of the present technology as described herein. The technology can be implemented, for example, in programmable circuitry 200 (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

The memory 210 in the data storage management system 100 may store the instructions for one or more aspects of the present technology, although some or all of the instructions may be stored elsewhere. The memory 210 may be implemented in a random access memory (RAM), a read only memory (ROM), a floppy disk, hard disk, or other computer readable medium which may be read by a magnetic, optical, or other reading system coupled to the processor 200 in the data storage management system 100.

The communication interface (input/output system) 220 in the data storage management system 100 operatively couples and enables communication with the client devices 110 and with the storage devices 130. By way of example only, the communications network 120 can use TCP/IP over Ethernet and industry-standard protocols, including NFS and CIFS, although other types of communication protocols can be used. The connection to the storage devices 130 may be enabled by known techniques such as Peripheral Component Interconnect Express (PCI-E) or TCP/IP.

A client device 110 may be a specialized or general purpose computer including a processor, memory, and input/output interface, coupled together by a bus or another link. A client 110 may be a mobile device, such a cell phone. The clients 110 (110a, 110b, . . . ) may run interface applications, such as Web browsers or specialized applications, to make requests for and/or send data to one or more application servers via the data storage management system 100. Each of the plurality of client computing devices 110 may utilize the data storage management system 100 to conduct one or more operations such as reading, writing, or modifying data.

Figure 3:
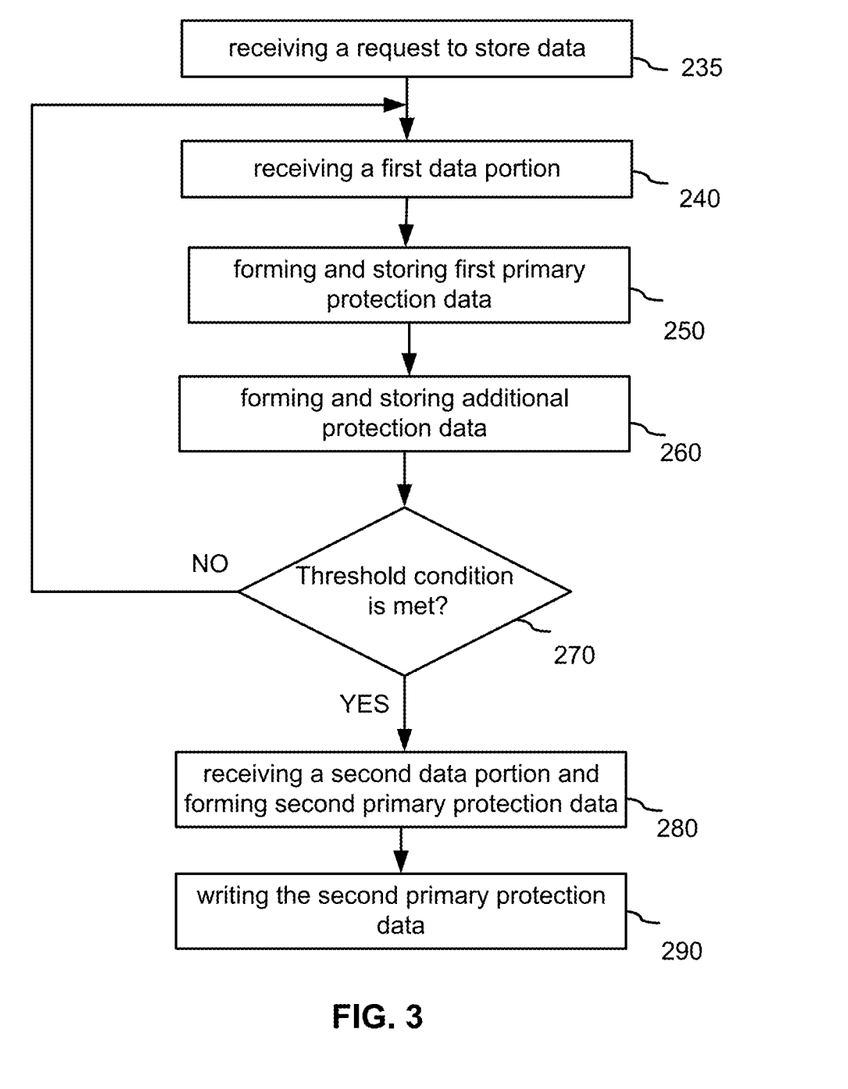
FIG. 3 is a flow chart of a computer-implemented method of managing a data storage system.

FIG. 3 is a flow chart of a method of data management in the data storage management system 100. In block 235, the data storage management system 100 receives a write request for writing data to the storage devices 130, and receives a first data portion at block 240. The first data portion may be received together with the storage request, or after the request.

In block 250, the data storage management system 100 forms first primary protection data by applying a data protection method to the first data portion. The data store management system 100 then writes the first primary protection data to a first subset of the storage devices 130. The first subset of the storage devices may consist of one or more, possibly all the storage devices in the data storage system 10. The primary protection data can include the first data portion encoded.

A variety of data protection methods may be used for forming and storing the first primary protection data to the storage devices 130. For instance, the data protection method used for forming the primary protection data can be an Erasure Coding (EC) technique, in which the first data portion is broken into fragments, and encoded. The fragments can be data fragments and protection fragments or a set of fragments each of which is encoded with protection information. The storage management system 100 can create primary and additional protection fragments and store them in the first subset of storage devices 130.

The first subset of storage devices 130 may be selected to increase and possibly maximize the degree of data protection provided for the first data portion, or to meet the storage reliability requirement communicated in the received storage request. A selected subset of storage devices may be selected so that additional protection data fragments are not co-resident with the primary protection data fragments or the data fragments.

In block 260, the data storage management system 100 forms additional protection data fragments and stores them in a second subset of the storage devices 130. The additional protection data fragments are formed from the first data portion and provide additional protection to the data against loss.

The storage management system 100 can store each of the first data portion, first primary protection data fragments, and additional protection data fragments in different storage devices to increase the reliability of the storage system and improve fault tolerance of the first data portion. The second subset of storage devices 130 may be mutually exclusive with the first subset of storage devices 130 to increase and possibly maximize the degree of data protection provided for the first data portion, or to exceed the storage reliability requirement communicated in the storage request.

In one embodiment, the additional protection data fragments are formed by using a data encoding method that provides variable levels of protection. The erasure coding method involves transforming a set of "k" fragments of a data object (e.g. the first data portion) into "n" erasure coded ("EC") fragments by adding "m" parity fragments, where "n=k+m" (thus referred to as "k+m" erasure coding scheme). Some examples of "k+m" erasure coding scheme include "2+1", "6+3" and "8+2" erasure coding schemes. A data object can be regenerated using any k of the n fragments. The "n" data fragments are likely spread across different ones of the storage devices 130. By way of example, the primary protection data may be formed using the "k+m" coding scheme, while the additional protection data may be formed using the "k+M" coding scheme, wherein k, m, and M are nonnegative integers and M is greater than m.

Receiving the first data portion and forming and storing the primary and additional protection data to the storage devices (240, 250, and 260) may be performed sequentially or concurrently, at least in part. The data storage management system 100 can repeatedly perform these operations for multiple portions of data received for storing while the storage devices 130 have unused (free) storage capacity not occupied by data stored therein. Free storage capacity is calculated by subtracting the amount of data being stored from the total storage capacity of the storage devices. The primary protection data may provide the level of fault tolerance requested by a user, e.g. in the storage request block 240, or a default level of fault tolerance predefined at the data storage management system 100. The existence of the additional protection data formed for each of the early received data portions increases the level of fault tolerance above the predefined or requested level. The fault tolerance parameters may be calculated based on the statistics available for the devices in the system 10 or expectations for the particular type of the device, and also on the data protection method used to encode the received portions of data.

The cycle of operations corresponding to blocks 240, 250, and 260 repeats while there is enough free storage capacity. After the data store management system 100 identifies that the system reaches a threshold in block 270, no more additional protection data is formed for newly received data portions. In addition, the previously created additional protection data may be deleted/overwritten with primary protection data for newly received data portions after the threshold is satisfied.

In block 270, the data store management system 100 evaluates a criterion related to free space in the storage system and identifies whether the criterion is met. In one embodiment, the data store management system 100 keeps track of the used or unused storage capacity in the system 10. The threshold condition occurs when the amount of the used storage capacity is greater than a predefined value, or when the amount of the unused storage capacity is less than a predefined value. In some aspects, the same parameters are monitored on a per storage device 130 basis, and the predefined criterion is met when, for each of the storage devices 130, the amount of free space is below a predefined limit. In yet another embodiment, the additional protection data is deleted/overwritten when there is no sufficient amount of storage capacity for writing the primary protection data formed from a newly received portion of data.

With reference to FIG. 3, the data portion to be stored in the system 10 after it has been identified that the threshold condition has been met, is referred to as a second data portion. However, the identifiers "first," "second," and 'third" used in this disclosure do not reflect the number or adjacency of received portions of data.

In block 280, the data storage management system 100 receives another ("second") data portion and forms second primary protection data based on the second data portion. The second primary protection data may be formed using the same encoding algorithm employed for the first data portion, although different portions of data may be encoded using different data protection algorithms.

It has been discussed above that identifying whether the predefined threshold criterion has been met (270) and receiving the second data portion (280) may be concurrent or happen in any order. However, writing the second primary protection data to a third subset of the storage devices (290) occurs after determining that the predefined value or the criterion has been met. Because the storage system 10 is low on free storage capacity, at least some of the additional protection data associated with the first data portion is overwritten with the primary protection data stored for the second data portion. Accordingly, the third subset of storage devices 130 includes at least some of the devices used for the additional protection data associated with the first data portion, and the second and third subsets of storage devices 130 at least partially overlap.

Figure 3A:
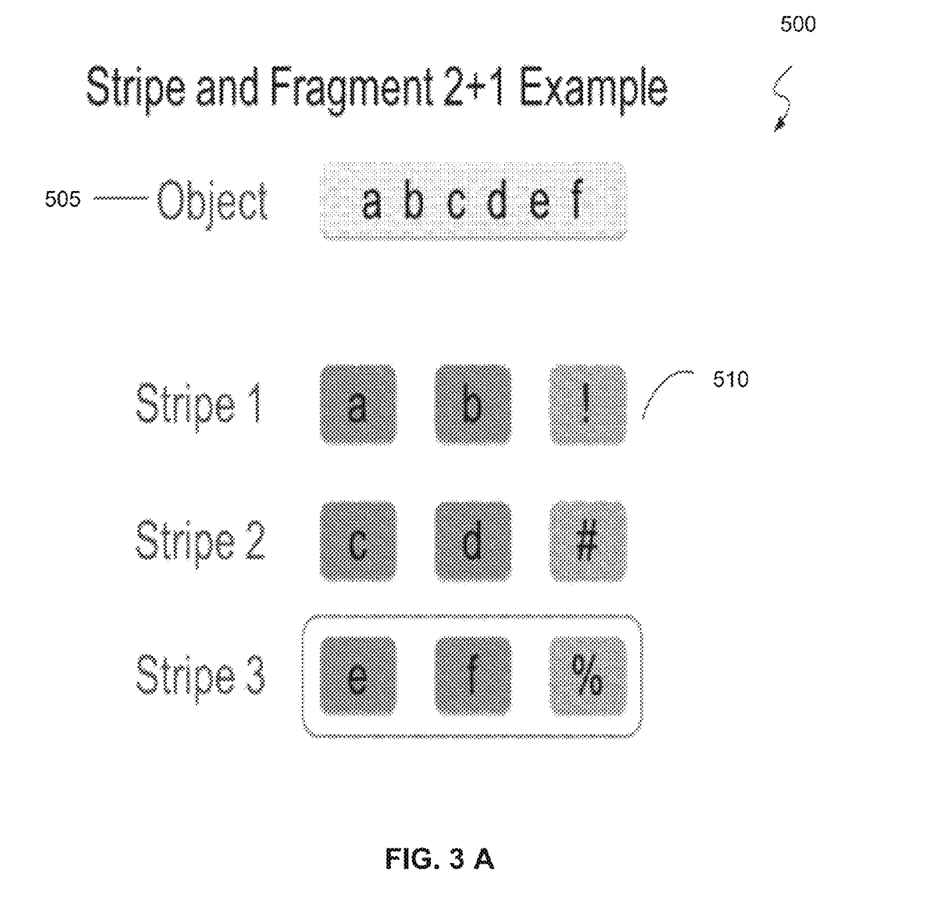
FIG. 3A is a schematic diagram illustrating a coding technique.

FIG. 3A is a block diagram of a process for erasure coding a data object using striping with a "2+1" erasure coding scheme 500. In this example, the data object 505 includes data that can be fragments into "6" data fragments. The data object 505 can be stored with a stripe width of 3 and erasure coded using a "2+1" erasure coding scheme, wherein the "2+1" means "2" data fragments and "1" parity fragment. With a stripe width of 3 and 6 data fragments, the object 505 is fragmented and encoded as 9 EC fragments 510. The 9 EC fragments comprise 2 data fragments and 1 protection fragment in each stripe. The EC fragments 510 can then be stored in a group of memory chunks that can span multiple storage devices 130

The storage system 10 is a distributed storage system that preserves the storage information in its metadata. This metadata can include identities of the storage devices that store each fragment of the encoded data. When a storage device in the distributed data storage system fails, objects that were stored in that storage device are determined and repaired to satisfy a reliability requirement.

Figure 4:
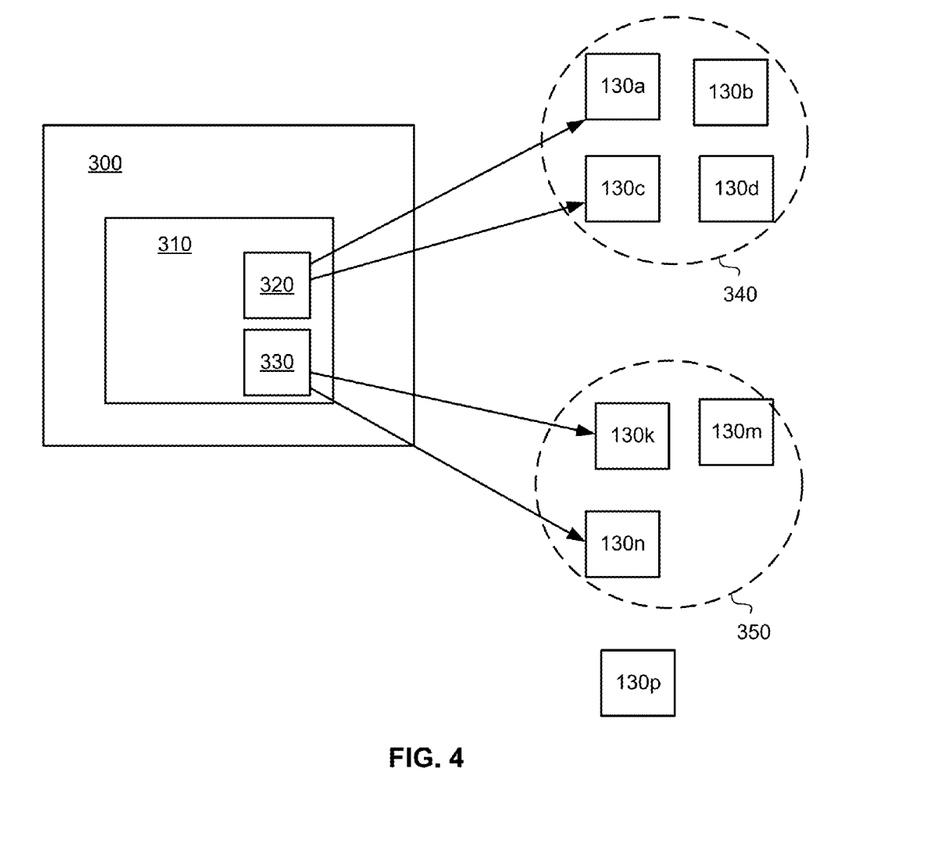
FIG. 4 is a schematic diagram of a metadata object associated with the first data portion.

FIG. 4 schematically illustrates a metadata object 310 within a metadata store 300. The object 310 includes metadata information 320, 330 about the primary protection data and additional protection data associated with the first data portion corresponding to block 240 (FIG. 3). The metadata information 320 relates to the first primary protection data stored in the first subset of storage devices 130. In the drawing, a first subset 340 includes storage devices 130a-130d, and the metadata information 320 includes references to or identifiers of those storage devices, illustrated by the arrows in FIG. 4. The metadata information 330 relates to the additional protection data stored in the second subset of storage devices 130. In the drawing, a second subset 350 includes storage nodes 130k, 130m, 130n, and the metadata information 330 includes references to or identifiers of those storage devices. FIG. 4 also depicts a storage device 130p that does is not part of either of the subsets 340, 350.

Figure 5:
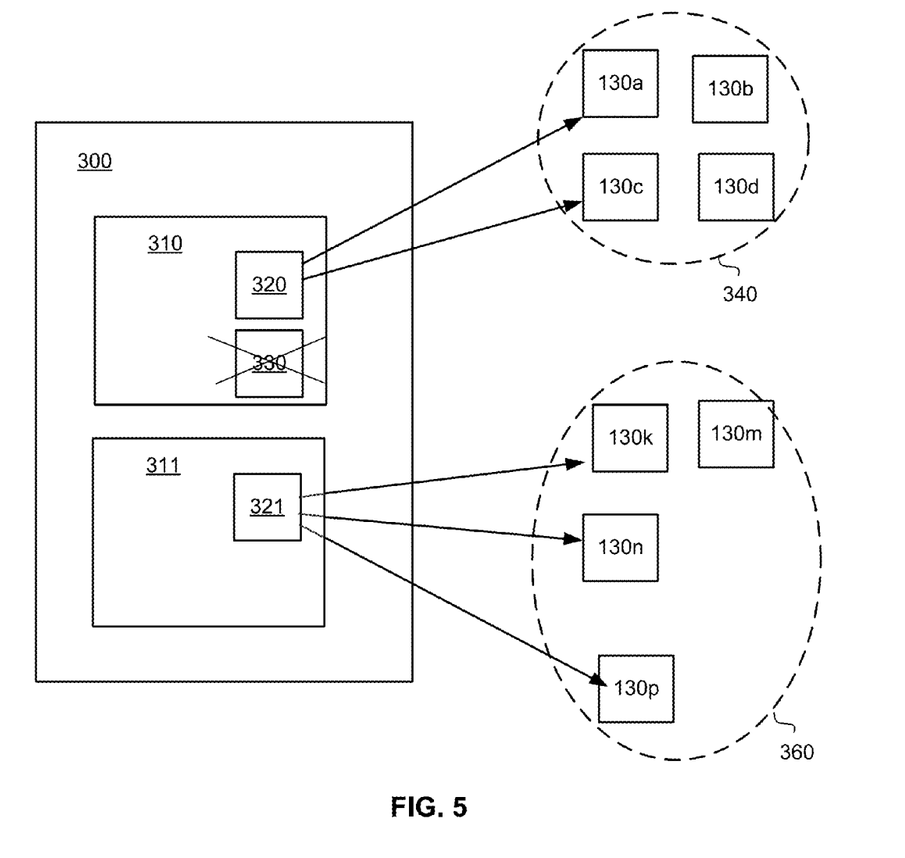
FIG. 5 is a schematic diagram including metadata objects associated with the first and second data portions.

When a predefined threshold criterion has been met (270), the second primary protection data formed from the second data portion is written over the additional protection data associated with the first data portion (290). FIG. 5 illustrates the metadata store 300 shown in FIG. 4, however, the metadata information 330 related to the additional protection data is deleted or invalidated. Instead, a metadata object 311 is added to the metadata store 300. The object 311 includes metadata information 321 about the primary protection data associated with the second data portion received in block 280 (FIG. 3). The metadata information 321 relates to the second primary protection data stored in a third subset 360 of storage devices 130. In the drawing, the third subset 360 includes storage devices 130k, 130n, 130m, and 130p. As illustrated, the storage devices 130k, 130n, and 130m were previously used for storing the additional protection data associated with the first data portion. The threshold was satisfied since storing of the second data portion and second protection data for the second data portion consumed the storage devices of the second subset 350 as well as the storage device 130p. Thus, the distributed storage system overwrites the additional protection data for the first data portion on the second subset 350 of storage devices with the second data portion and/or protection data for the second data portion.

For the period of time when the storage system is not full, the storage system is able to survive larger faults, reduce the rebuild cost of faults, and defer the need to rebuild faults, at no cost of additional storage resources. When a failure occurs that is not recoverable with just the specified protection information, an object can be recovered using the additional opportunistic protection information. Additionally, when a failure occurs, rebuild calculations can be avoided by using the opportunistic protection information (additional protection data) to become the specified protection information. This allows rebuilds to be completely avoided, or deferred. The method disclosed herein reduces the probability of data loss (when the storage system is not completely full), at no extra hardware cost, and only a small extra wear cost.

The data store management system 100 monitors two values related to free space in the storage devices. The first value accounts for all the storage capacity consumed by the primary and additional protection data, and is used for identifying whether additional protection data may be stored for the next received portion of data, or some additional protection data already stored in the storage system 10 should be overwritten by the primary protection data formed from the next received portion of data. The second value relates to free space in the storage devices, and includes the space occupied by additional protection data, which is considered to be "free" and available for storage of data that may be received in the future. The second value characterizes the capacity of the system to store more data and is reported to the system administrator as the amount of storage capacity available to store new data.

Although examples of the data store management computing system 100 and the plurality of client computing devices are described herein, each of these systems can be implemented on any suitable computer system or computing device. It is to be understood that the devices and systems of the examples described herein are for example purposes, as many variations of the specific hardware and software used to implement the examples are possible.

The method presented in the instant disclosure may be embodied in a non-transitory machine readable medium having stored thereon instructions for performing one or more aspects of the present technology as described herein, wherein the instructions when executed by a processor, cause the processor to carry out the operations to implement at least some of the aspects of the technology as described and illustrated herein.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
    determining a first protection level for an object based on a client request to store the object in a distributed storage system;
    generating a first plurality of fragments from the object according to a first data protection method that satisfies the first protection level, wherein the first plurality of fragments comprises primary data protection fragments;
    based on a determination that a consumed storage space threshold has not yet been satisfied, generating a set of one or more additional data protection fragments according to a second data protection method, wherein the additional data protection fragments exceed the first protection level;
    storing the first plurality of fragments and the set of one or more additional data protection fragments in the distributed storage system;
    based on a second client request to store a second object in the distributed storage system, determining that the consumed storage space threshold will be satisfied by storing the second object in the distributed storage system;
    based on determining that the consumed storage space threshold will be satisfied, generating a third plurality of fragments from the second object based on a protection level specified for the second object in the second client request; and
    suspending generating additional data protection fragments while the consumed storage space threshold is satisfied.

2. The method of claim 1 further comprising storing the first plurality of fragments in a first set of storage devices and storing the additional data protection fragments in a second set of storage devices.

3. The method of claim 1, wherein the first and the second data protection methods are different data protection methods.

4. The method of claim 1 further comprising overwriting at least a portion of the set of one or more additional data protection fragments with at least some of the third plurality of fragments.

5. The method of claim 1 further comprising:
    maintaining a first value of storage space consumed by fragments including additional data protection fragments and a second value of storage space consumed by fragments that are not additional data protection fragments; and
    using the first value to determine whether the consumed storage space threshold is satisfied.

6. The method of claim 5 further comprising providing an indication of capacity of the distributed storage system based on the second value.

7. The method of claim 1 further comprising determining that rebuild of a lost fragment of the first plurality of fragments is deferred or avoided based on availability of the set of one or more additional data protection fragments.

8. One or more non-transitory machine-readable media comprising program code for using free space for opportunistic data protection, the program code to:
    determine a first protection level for an object based on a client request to store the object in a distributed storage system;
    generate a first plurality of fragments from the object according to a first data protection method that satisfies the first protection level, wherein the first plurality of fragments comprises primary data protection fragments;
    based on a determination that a consumed storage space threshold has not yet been satisfied, generate a set of one or more additional data protection fragments according to a second data protection method, wherein the additional data protection fragments exceed the first protection level;
    store the first plurality of fragments and the set of one or more additional data protection fragments in the distributed storage system;
    based on a second client request to store a second object in the distributed storage system, determine that the consumed storage space threshold will be satisfied by storing the second object in the distributed storage system;

based on a determination that the consumed storage space threshold will be satisfied, generate a third plurality of fragments from the second object based on a protection level specified for the second object in the second client request; and suspend generation of additional data protection fragments while the consumed storage space threshold is satisfied.

9. The non-transitory machine-readable media of claim 8 further comprising program code to store the first plurality of fragments in a first set of storage devices and to store the additional data protection fragments in a second set of storage devices.

10. The non-transitory machine-readable media of claim 8, wherein the first and the second data protection methods are different data protection methods.

11. The non-transitory machine-readable media of claim 8 further comprising program code to overwrite at least a portion of the set of one or more additional data protection fragments with at least some of the third plurality of fragments.

12. The non-transitory machine-readable media of claim 8 further comprising program code to:

maintain a first value of storage space consumed by fragments including additional data protection fragments and a second value of storage space consumed by fragments that are not additional data protection fragments; and use the first value to determine whether the consumed storage space threshold is satisfied.

13. The non-transitory machine-readable media of claim 12 further comprising program code to provide an indication of capacity of the distributed storage system based on the second value.

14. The non-transitory machine-readable media of claim 8 further comprising program code to determine that rebuild of a lost fragment of the first plurality of fragments is deferred or avoided based on availability of the set of one or more additional data protection fragments.

15. An apparatus comprising:

a micro-processor; and a machine-readable medium having program code executable by the micro-processor to cause the apparatus to, determine a first protection level for an object based on a client request to store the object in a distributed storage system;

generate a first plurality of fragments from the object according to a first data protection method that satisfies the first protection level, wherein the first plurality of fragments comprises primary data protection fragments;

based on a determination that a consumed storage space threshold has not yet been satisfied, generate a set of one or more additional data protection fragments according to a second data protection method, wherein the additional data protection fragments exceed the first protection level;

store the first plurality of fragments and the set of one or more additional data protection fragments in the distributed storage system;

based on a second client request to store a second object in the distributed storage system, determine that the consumed storage space threshold will be satisfied by storing the second object in the distributed storage system;

based on a determination that the consumed storage space threshold will be satisfied, generate a third plurality of fragments from the second object based on a protection level specified for the second object in the second client request; and suspend generation of additional data protection fragments while the consumed storage space threshold is satisfied.

16. The apparatus of claim 15, wherein the machine-readable medium further comprises program code executable by the micro-processor to cause the apparatus to overwrite at least a portion of the set of one or more additional data protection fragments with at least some of the third plurality of fragments.

17. The apparatus of claim 15, wherein the machine-readable medium further comprises program code executable by the micro-processor to cause the apparatus to:

maintain a first value of storage space consumed by fragments including additional data protection fragments and a second value of storage space consumed by fragments that are not additional data protection fragments; use the first value to determine whether the consumed storage space threshold is satisfied; and provide an indication of capacity of the distributed storage system based on the second value.

* * * * *